United States Patent [19]

Fujii

[11] Patent Number: 5,248,961
[45] Date of Patent: Sep. 28, 1993

[54] TRACK BALL

[75] Inventor: Akihito Fujii, Maebashi, Japan

[73] Assignee: Hosiden Corporation, Osaka, Japan

[21] Appl. No.: 942,377

[22] Filed: Sep. 9, 1992

Related U.S. Application Data

[63] Continuation-in-part of Ser. No. 793,311, Nov. 14, 1991, abandoned, which is a continuation of Ser. No. 596,002, Oct. 11, 1990, abandoned.

[30] Foreign Application Priority Data

Oct. 16, 1989 [JP] Japan .................. 1-120854[U]

[51] Int. Cl.$^5$ ............................................. G09G 3/02
[52] U.S. Cl. .................................. 345/167; 338/128; 345/164
[58] Field of Search .................. 340/706, 709, 710; 338/128; 74/198

[56] References Cited

U.S. PATENT DOCUMENTS

| | | | |
|---|---|---|---|
| 4,538,476 | 9/1985 | Luque | 340/710 |
| 4,623,787 | 11/1986 | Kim | 340/710 X |
| 4,786,892 | 11/1988 | Kubo et al. | 340/710 X |
| 4,881,065 | 11/1989 | Soma et al. | 340/706 X |
| 4,933,670 | 6/1990 | Wislocki | 340/710 X |

Primary Examiner—Ulysses Weldon
Attorney, Agent, or Firm—Pollock, Vande Sande and Priddy

[57] ABSTRACT

The case of a track ball structure has X-axis and Y-axis encoder shafts provided therein and X-axis and Y-axis driven rollers rotatably coupled with said shafts and provided closer to the top panel of the case than said shafts. A ball makes rotary contact with the X-axis and Y-axis driven rollers and is held to partly protrude from an opening made in the top panel of the case.

4 Claims, 4 Drawing Sheets

TRACK BALL

This application is a continuation-in-part of Ser. No. 07/793,311, filed on Nov. 14, 1991, now abandoned, which in turn is a continuation of Ser. No. 07/596,002 filed on Oct. 11, 1990, now abandoned.

BACKGROUND OF THE INVENTION

The present invention relates to a track ball structure in which, when its ball is rotated, the rotation is decomposed into rotation of an X-direction component and rotation of a Y-direction component and signals representing the amounts and directions of the X- and Y-direction components are produced. These signals are entered into, for example, a personal computer to thereby move a cursor on its display screen.

FIGS. 1 and 2 show a conventional track ball structure. In a rectangular case 11 a ball 12 is rotatably supported and partly protrudes from the case 11 through an opening made in its top and an X-axis driven roller 13x and a Y-axis driven roller 13y, which are disposed at right angles to each other and have their peripheral surfaces frictionally coupled with the ball 12, are rotatably supported. The X-axis and Y-axis driven rollers 13x and 13y have X-axis and Y-axis rotary encoders 14x and 14y affixed to their shafts, respectively.

As the ball 12 is rotated, the X-axis and Y-axis driven rollers 13x and 13y are driven in accordance with the components of rotation in the X and Y directions, and signals corresponding to the amounts and directions of rotation of the X-axis and Y-axis driven rollers 13x and 13y are provided by the X-axis and Y-axis rotary encoders 14x and 14y, respectively. Where the rotary encoders 14x and 14y are of the optical type, light shielding plates 14x and 14y, each having slits of a predetermined pattern, are mounted on the shafts of the rollers 13x and 13y and a light emitting element and a light receiving element are disposed opposite one another across each light shielding plate. When the rotary encoders 14x and 14y are of the magnetic type, a plurality of magnets are arranged on each of the discs 14x and 14y circumferentially thereof and a magnetic sensor is disposed adjacent each disc in opposing relation to its circumference where the magnets are placed. When the encoders 14x and 14y are mechanical encoders, a printed circuit board having a predetermined conductive contact pattern is mounted on each of the rollers 13x and 13y and a contact piece is held in sliding contact with the patterned side of the printed circuit board.

In all the cases of such optical, magnetic and mechanical rotary encoders, rotary discs are affixed to the shafts of the rollers 13x and 13y.

Since in the prior art such a relatively large rotary disc is affixed directly to the shaft of each of the X-axis and Y-axis driven rollers 13x and 13y, the rotary disc (the above-mentioned light shielding plate or printed circuit board) which is used as each of the rotary encoders 14x and 14y is required to have a diameter, for example, equal to or more than 10 mm, for detecting the rotation with accuracy higher than a predetermined value. In order to house such relatively large rotary discs in the case 11, with their axes of rotation held at right angles to each other, and to keep them out of contact with the ball 12 in the case 11, it is necessary that the case 11 be sufficiently larger than the diameter of the ball 12 in both of the X and Y directions. Further, in the conventional track ball structure, the ball 12 is appreciably large in diameter, because it is required to sufficiently project upward from the top of the case 11 as well as to make contact with the driven rollers 13x and 13y which are rotary shafts of the rotary encoders 14x and 14y. In the prior art the track ball is embedded in an operating box provided separately of the keyboard, and hence need not be reduced in size. In the case where the track ball must be disposed on the keyboard, however, it is sometimes preferable to reduce its size in at least the X or Y direction so that it is of the same size as each key, for example.

SUMMARY OF THE INVENTION

It is therefore an object of the present invention to provide a small track ball structure having its length reduced in at least the X or Y direction.

According to the present invention, a narrow elongated case having a top panel and a bottom is provided with a circular opening in said top panel, a rotatable ball having a diameter slightly larger than the diameter of said circular opening partly protrudes above said top panel from said opening, an X-axis encoder shaft and a Y-axis encoder shaft are provided in a case at positions substantially at the center of the case in the direction of protrusion of said ball, and an X-axis driven roller and a Y-axis driven roller are disposed in the case at positions closer to the top of the case than to the bottom of the case in parallel to the shafts closer to the top panel of the case than the shafts. The rotation of the X-axis driven roller is transmitted by an X-axis rotation transmitting means to the X-axis encoder shaft and the rotation of the Y-axis driven roller is transmitted by a Y-axis rotation transmitting means to the Y-axis encoder shaft. An X-axis rotary encoder and a Y-axis rotary encoder are mounted on the X-axis encoder shaft and the Y-axis encoder shaft the diameter of each of said rotary encoders being substantially equal to the interior height of the case between said top panel and the bottom of the case.

Since the X-axis and Y-axis driven rollers are nearer to the top panel of the case 11 than the X-axis and Y-axis encoder shafts with the rotary encoders affixed thereto, a relatively small ball can be disposed so that it makes contact with the driven rollers and protrudes to a significant extent out of the top panel of the case; hence, the track ball structure can be made small in its entirety.

DESCRIPTION OF THE PREFERRED EMBODIMENT

Figure 1:
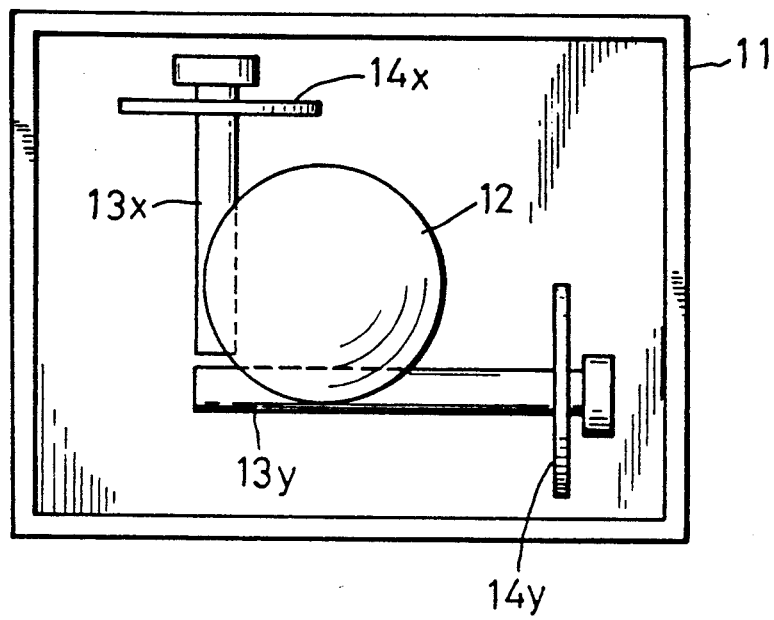
FIG. 1 is a plan view schematically showing a conventional track ball structure, with a top panel taken off.
Figure 2:
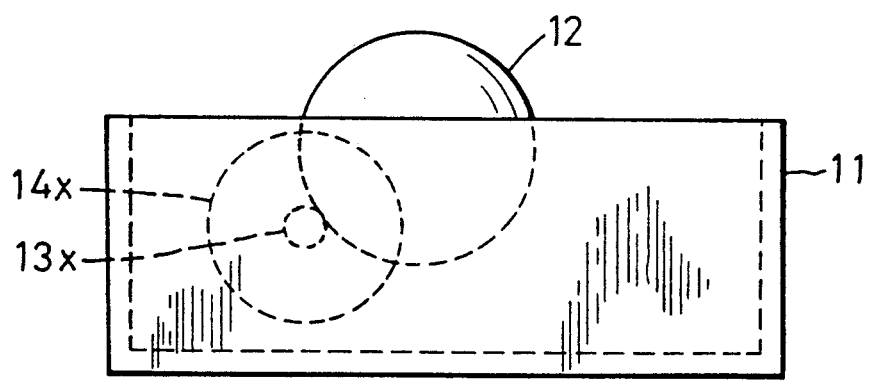
FIG. 2 is its front view.
Figure 3:
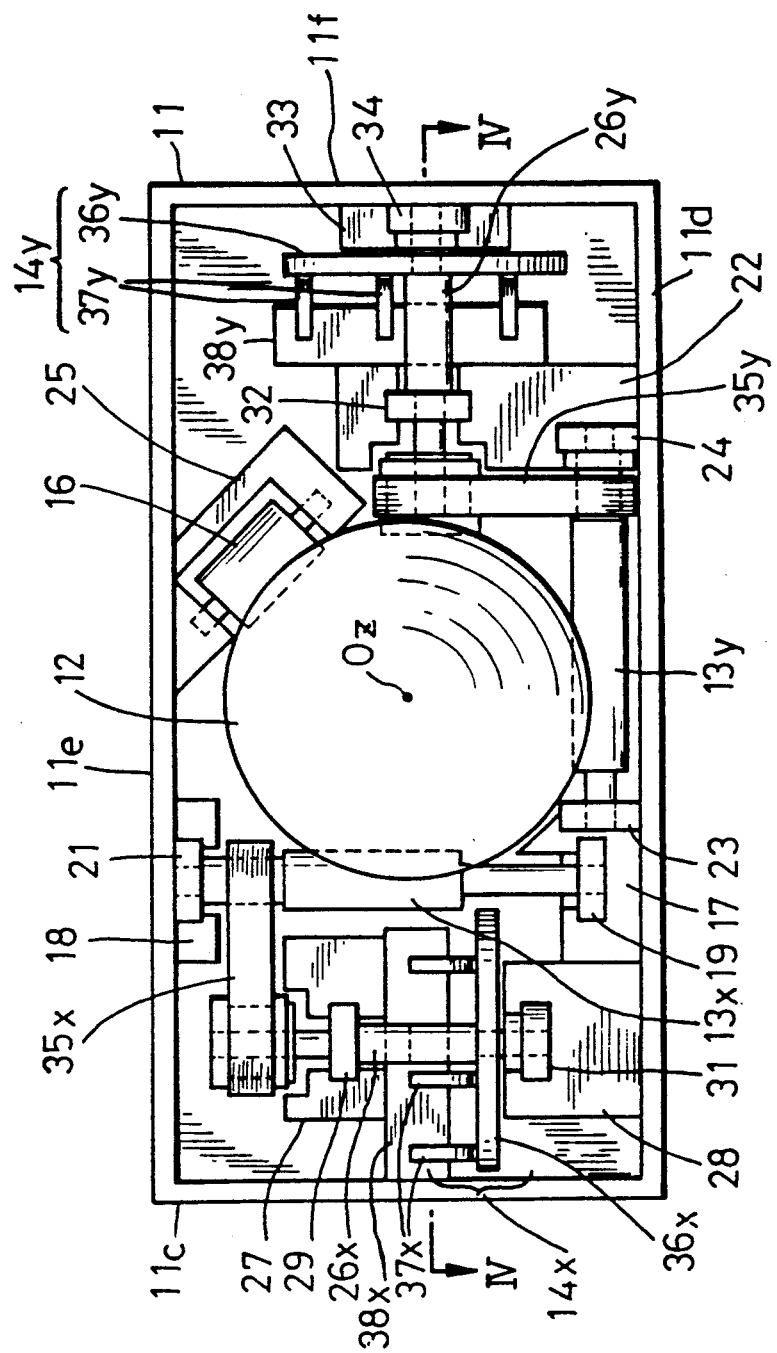
FIG. 3 is a plan view illustrating an embodiment of the present invention, with a top panel taken off.
Figure 4:
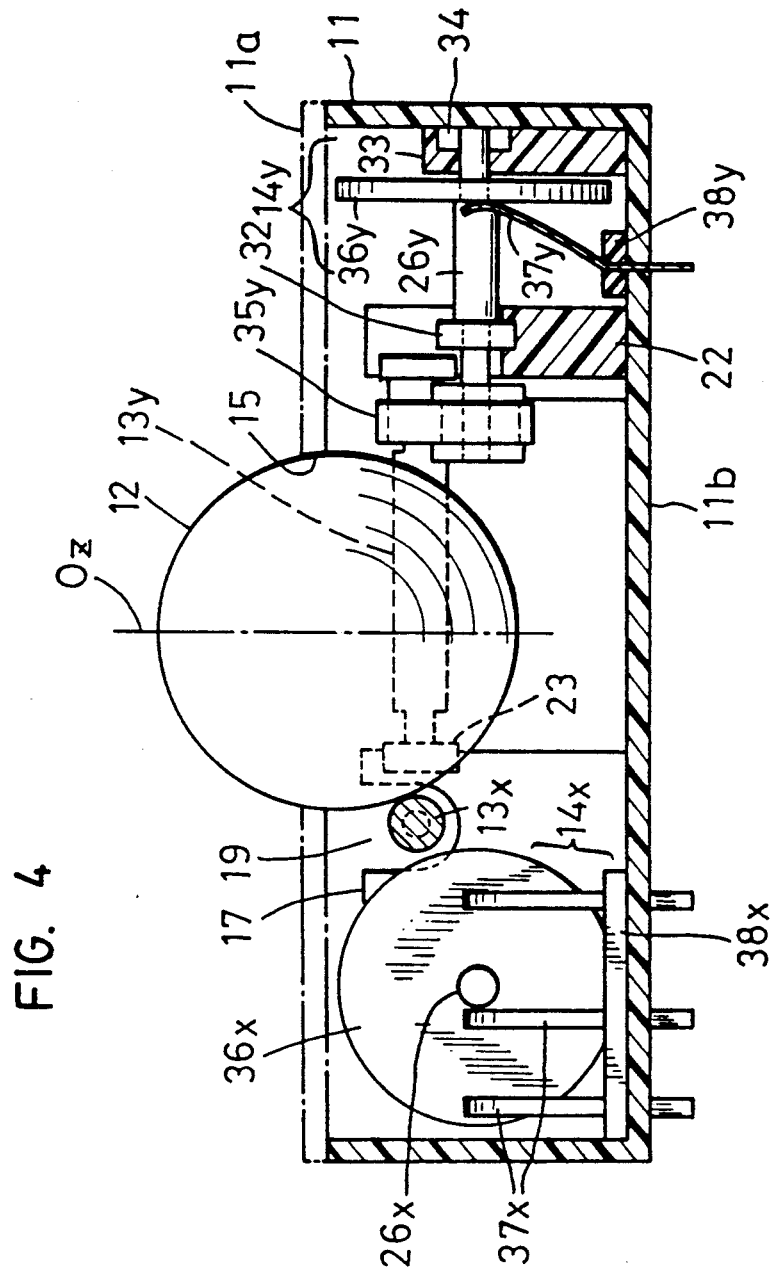
FIG. 4 is a sectional view taken on the line IV—IV in FIG. 3.

FIG. 3 is a plan view illustrating an embodiment of the present invention, with a top panel 11a taken off, and FIG. 4 is its sectional view taken on the line IV—IV in FIG. 3. In this embodiment the case 11 is a narrow, long parallelpipedic case, which has a centrally-disposed circular opening 15 in its top panel 11a. The ball 12 partly protruding out of the circular opening 15 is rotatably supported in the case 11. As shown in FIG. 4, the X-axis and Y-axis driven rollers 13x and 13y are disposed slightly below the center of the ball 12, with their peripheral surfaces held in frictional contact with the ball 12. The X-axis and Y-axis driven rollers 13x and 13y are disposed in parallel to the bottom panel 11b of the case 11 and at right angles to each other at positions closer to the top of the case than to the bottom of the case. The X-axis driven roller 13x extends in parallel to the left side panel 11c of the case 11, whereas the Y-axis driven roller 13y extends in adjacent but parallel relation to the front panel 11d of the case 11. A support roller 16 is disposed on the opposite side from the X-axis and Y-axis driven rollers 13x and 13y with respect to the vertical center axis $O_Z$ of the ball 12 and at an angle of about 45 degrees to the rollers 13x and 13y is in rotary contact with the ball 12 a little below its center. The X-axis driven roller 13x is rotatably supported at both ends by a pair of opposed bearings 19 and 21 mounted on support portions 17 and 18 planted on the bottom panel 11b of the case 11 along its front and rear panels 11d and 11e. On the opposite side from the X-axis driven roller 13x with respect to the ball 12 the Y-axis driven roller 13y is likewise rotatably supported at both ends by a pair of opposed bearings 23 and 24 fitted in the support portion 17 and a support post 22 planted on the bottom panel 11b and extending from the front panel 11d in parallel to the right side panel 11f. The support roller 16 is rotatably supported at both ends by both leg portions of a U-shaped support member 25 planted on the bottom panel 11b of the case 11. The diameter of the opening 15 made in the top panel 11a of the case 11 is slightly smaller than the diameter of the ball 12. The ball 12 is held in the case 11 so that it is slidable along the circumferential edge of the opening 15 and rotatable in any directions when the peripheral surfaces of the rollers 13x, 13y and 16 make rotary contact with the ball 12. As the ball 12 is rotated, the X-axis and Y-axis driven rollers 13x and 13y are rotated accordingly.

An X-axis rotary encoder shaft 26x is provided in parallel to the X-axis driven roller 13x, closer to the bottom panel 11b than it roller 13x, and substantially at the center of the case in the direction of protrusion of ball 12. That is, the X-axis driven roller 13x is disposed closer to the top panel 11a than the X-axis encoder shaft 26x. In this example, the X-axis encoder shaft 26x is placed intermediate between the X-axis driven roller 13x and the left side panel 11c. The X-axis encoder shaft 26x is rotatably supported by bearings 29 and 31 mounted on support posts 27 and 28 planted on the bottom panel 11b. A Y-axis encoder shaft 26y is disposed in parallel to the Y-axis driven roller 13y, closer to the bottom panel 11b than roller 13y, and substantially at the center of the case in the direction of protrusion of ball 12. In other words, the Y-axis driven roller 13y is positioned closer to the top panel 11a than the Y-axis encoder shaft 26y. In the illustrated example, the Y-axis encoder shaft 26y is placed intermediate between the front and rear panels 11d and 11e and is displaced lengthwise thereof so that one end portion is opposed to one end portion of the Y-axis driven roller 13y. The Y-axis encoder shaft 26y is rotatably supported by a bearing 32 mounted on the support plate 22 and a bearing 34 mounted on a support portion 33 formed integrally with the right side panel 11f.

A belt 35x is stretched, as an X-axis rotation transmitting means, between the X-axis driven roller 13x and the X-axis encoder shaft 26x, by which the rotation of the former is transmitted to the latter. Similarly, a belt 35y is stretched, as a Y-axis rotation transmitting means, between the Y-axis driven roller 13y and the Y-axis encoder shaft 26y, for transmitting the rotation of the former to the latter.

The X-axis encoder shaft 26x has affixed thereto the X-axis rotary encoder 14x. In this example the rotary encoder 14x is shown to be a mechanical encoder; in this instance, a circular printed circuit board 36x having a diameter substantially equal to the interior height of case 11, as shown in FIG. 4, and having a contact pattern formed thereon, is mounted on the X-axis encoder shaft 26x, and contact pieces 37x are resiliently pressed at one end against the printed circuit board 36x and fixed at the other ends to a hold plate 38x which is secured to the bottom panel 11b of the case 11. Likewise, the Y-axis rotary encoder 14y is affixed to the Y-axis encoder shaft 26y. In this embodiment a circular printed circuit board 36y also having a diameter substantially equal to the interior height of case 11, and having a contact pattern formed thereon, is mounted on the Y-axis encoder shaft 26y, and contact pieces 37y are resiliently pressed at one end against the printed circuit board 36y and fixed at the other ends to a hold plate 38y which is secured to the bottom panel 11b. The fixed end portions of the contact pieces 37x and 37y project out of the bottom panel 11b of the case 11 to form terminals.

As the ball 12 is rotated, the X-axis driven roller 13x is rotated in accordance with the X component of rotation of the ball 12, by which the X axis encoder shaft 26x is driven, and consequently, the X-axis rotary encoder 14x yields a signal corresponding to the amount and direction of the X component of the rotation of the ball 12. In a similar manner, the Y-axis driven roller 13y is rotated in accordance with the Y component of the rotation of the ball 12, by which the Y-axis encoder shaft 26y is driven, and the Y-axis rotary encoder 14y produces a signal corresponding to the amount and direction of the Y component of the rotation of the ball 12.

Figure 5:
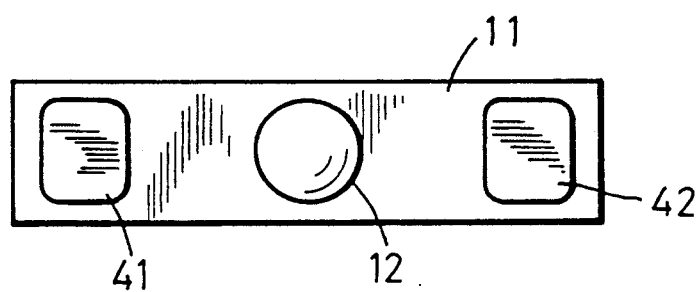
FIG. 5 is a plan view illustrating another embodiment of the present invention in which an input switch and a cancel switch are provided.
Figure 6:
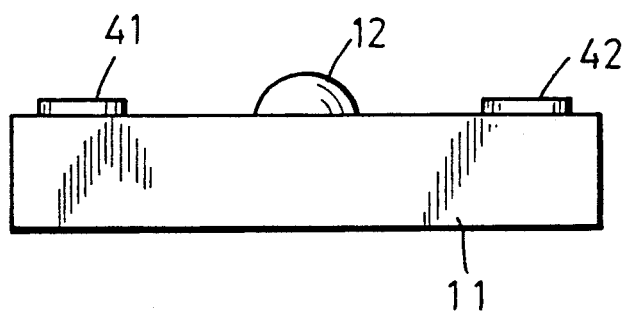
FIG. 6 is its front view.

The X-axis and Y-axis rotary encoders 14x and 14y are not limited specifically to the mechanical encoders but may also be any of the optical, magnetic and other types. The belts 35x and 35y may also be replaced with gears and other rotation transmitting means. A switch 41 for entering the position of a cursor moved on a display screen (not shown) by operating the ball 12 and a switch 42 for canceling the position of the cursor may also be provided on the top of the case 11 at both end portions thereof, as shown in FIGS. 5 and 6.

As described above, according to the present invention, the X-axis and Y-axis encoder shafts 26x and 26y are driven by the X-axis and Y-axis driven rollers 13x and 13y, respectively, and the rollers 13x and 13y are positioned higher than the encoder shafts 26x and 26y which have the X-axis and Y-axis rotary encoders 14x and 14y affixed thereto, respectively. As a result, even if the ball 12 is made relatively small and the rotary discs forming the rotary encoders 14x and 14y (the printed circuit boards 36x and 36y in the embodiment) are made large in diameter i.e., substantially equal in diameter to the interior height of the case, so as to detect the rotation of the ball 12 with a sufficiently high degree of accuracy, and the ball 12 can be caused to protrude from the top of the case 11 to a height large enough to ensure good operability. For instance, when the diameter of each rotary encoder disc is 10 mm, the diameter of the ball 12 needs to be 40 mm or more in the prior art, but according to the present invention, the diameter of the ball 12 can be about 13 mm. This affords reduction of the overall size of the track ball structure. As will be seen from FIG. 3, both side panels 11c and 11f can be made particularly short.

By providing the X-axis and Y-axis encoder shafts 26x and 26 separately of the X-axis and Y-axis driven rollers 13x and 13y, the degree of freedom in design increases. As in the embodiments described above, the X-axis and Y-axis rotary encoders 14x and 14y are disposed on both sides of the ball 12, that is, they are aligned, by which the case 11 can be formed narrow and long and the entire space within the case 11 can be utilized efficiently. Consequently, the track ball structure can be reduced in size as a whole.

It will be apparent that many modifications and variations may be effected without departing from the scope of the novel concepts of the present invention.

What is claimed is:

1. A track ball structure comprising:
   a narrow, elongated case having a top panel and a bottom, said case being provided with a circular opening in its said top panel;
   a ball in said case having a diameter slightly larger than the diameter of said circular opening and partly protruding above said top panel from said circular opening, said ball being rotatably held in said case;
   an X-axis driven roller and a Y-axis driven roller disposed in said case at positions closer to the top of said case than to the bottom of said case, the axes of said rollers being at right angles to each other and said rollers being driven to follow the rotation of said ball;
   an X-axis encoder shaft disposed in said case in parallel relation to said X-axis driven roller at a location closer to the bottom of said case than said X-axis driven roller and substantially at the center of the case in the direction of protrusion of said ball;
   a Y-axis encoder shaft disposed in said case parallel to said Y-axis driven roller at a location closer to the bottom of the case than said Y-axis driven roller and substantially at the center of the case in the direction of protrusion of said ball, said Y-axis driven roller and said Y-axis encoder shaft being staggered axially thereof so that one end portion of said Y-axis driven roller faces one end portion of said Y-axis encoder shaft;
   X-axis rotation transmitting means and Y-axis rotation transmitting means in said case for transmitting the rotation of said X-axis driven roller and said Y-axis driven roller to said X-axis encoder shaft and said Y-axis encoder shaft respectively; and
   a circular X-axis rotary encoder and a circular Y-axis rotary encoder mounted in said case on said X-axis encoder shaft and said Y-axis encoder shaft, respectively, for providing signals corresponding to the amounts and direction of rotation of said X-axis and Y-axis encoder shafts, respectively, the diameter of each of said rotary encoders being substantially equal to the interior height of said case between said top panel and bottom of said case.

2. The track ball structure of claim 1, wherein said elongated case is of rectangular parallelpipedic configuration and is formed by top, bottom, front, rear, right and left side panels; said opening being in said top panel centrally thereof; said X-axis driven roller being disposed parallel to said left side panel; said X-axis encoder shaft being disposed between and parallel to said X-axis driven roller and said left side panel; said Y-axis driven roller being disposed adjacent and parallel to said front panel; and said Y-axis encoder shaft being disposed between and parallel to said front and rear panels.

3. The track ball structure of claim 1 or 2, wherein a pair of switches are provided on said top panel of said case on opposite sides of said ball.

4. The track ball structure of claim 1 wherein said X-axis driven roller and said Y-axis driven roller each engage said ball below the center of said ball.

* * * * *